Jan. 8, 1924. 1,480,390
J. HARTNESS
APPARATUS FOR INSPECTING AND GAUGING SCREW THREADS
Filed Feb. 17, 1920 12 Sheets-Sheet 5
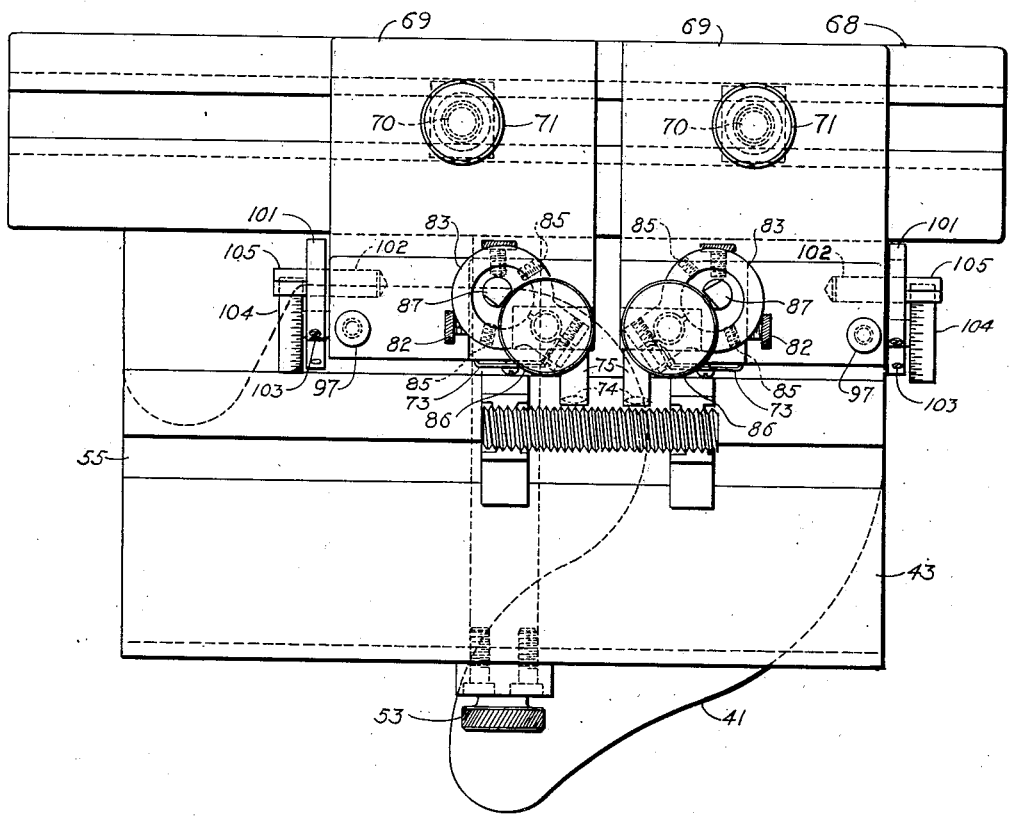
Inventor:
JAMES HARTNESS
Attys.

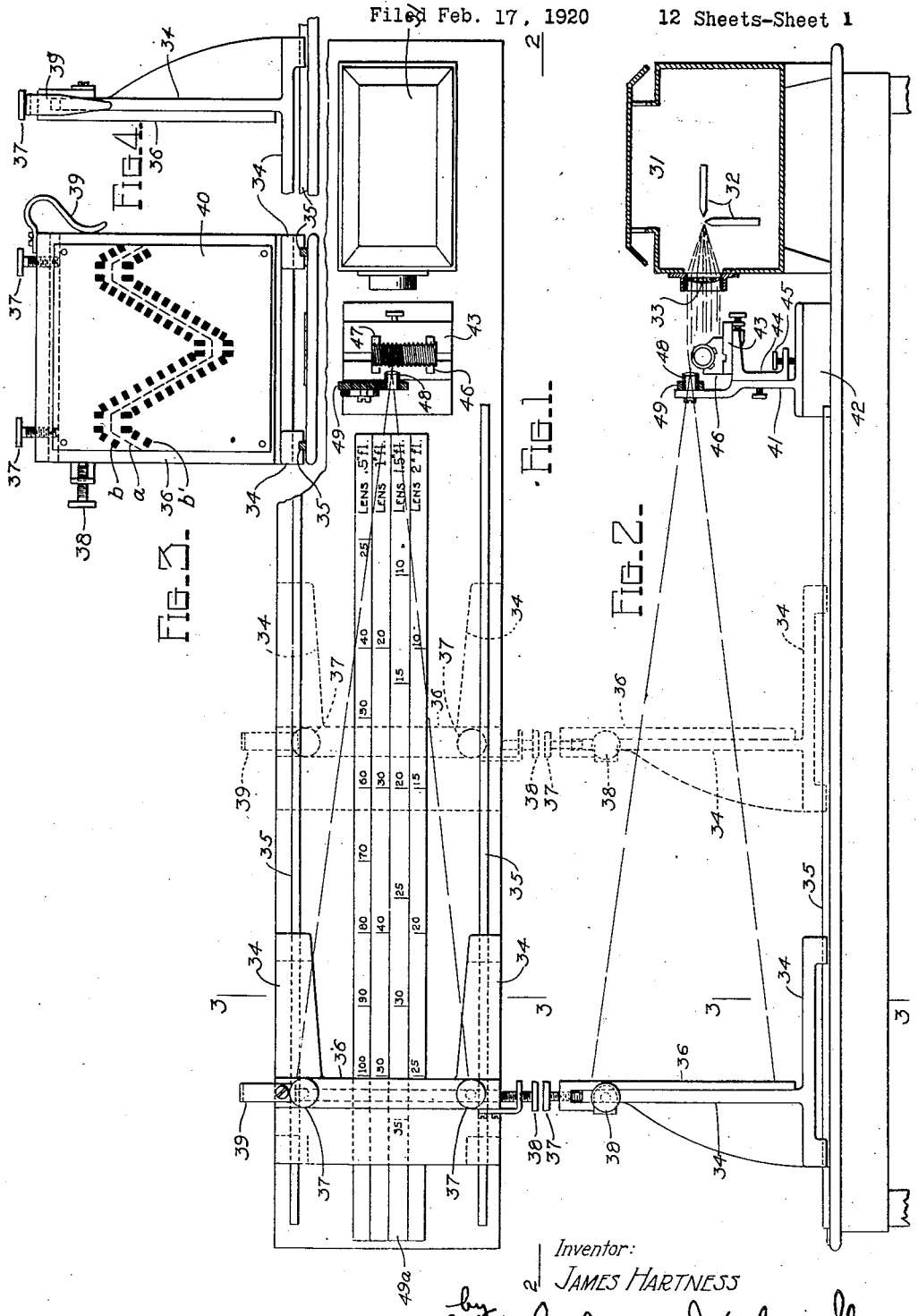

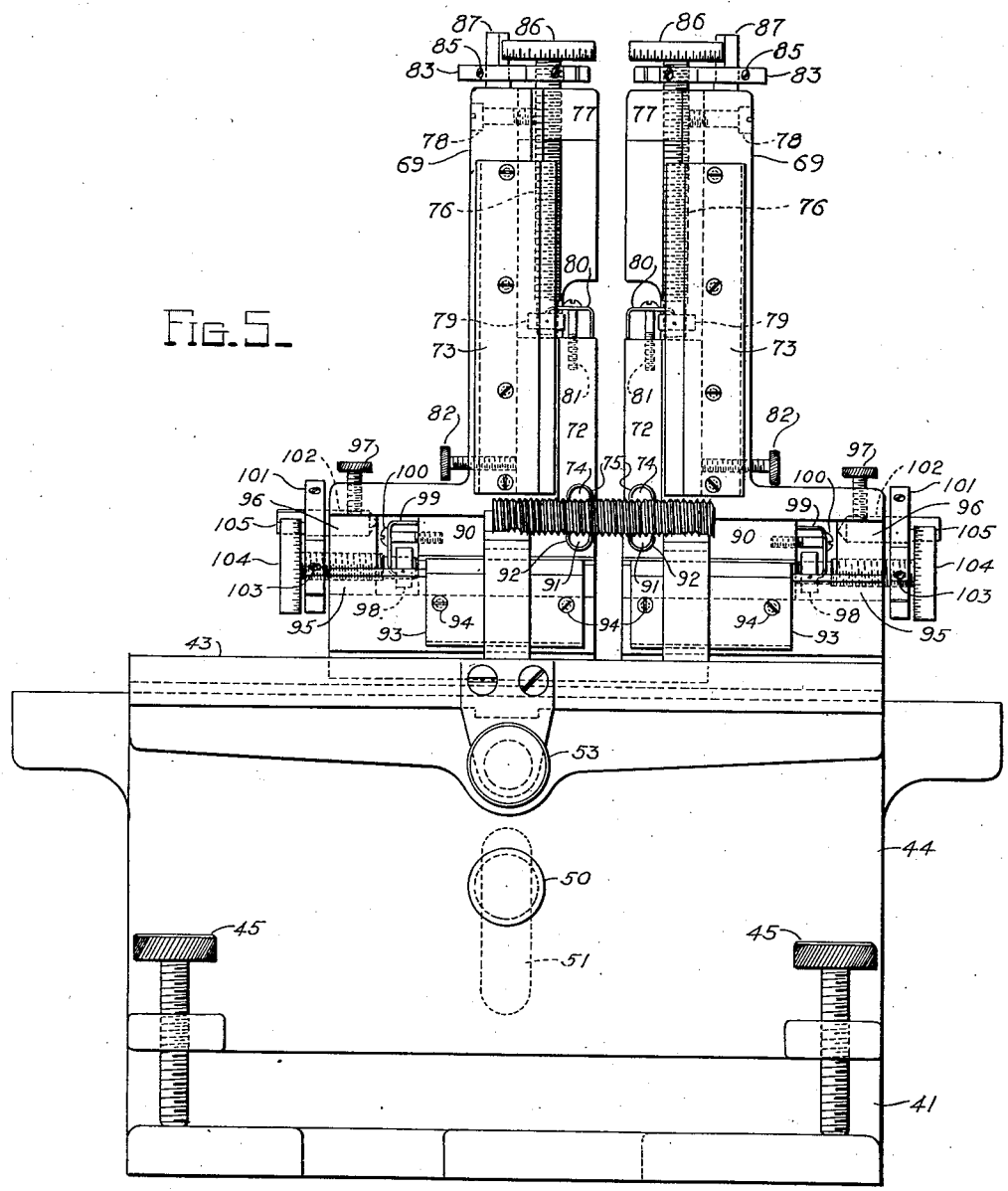

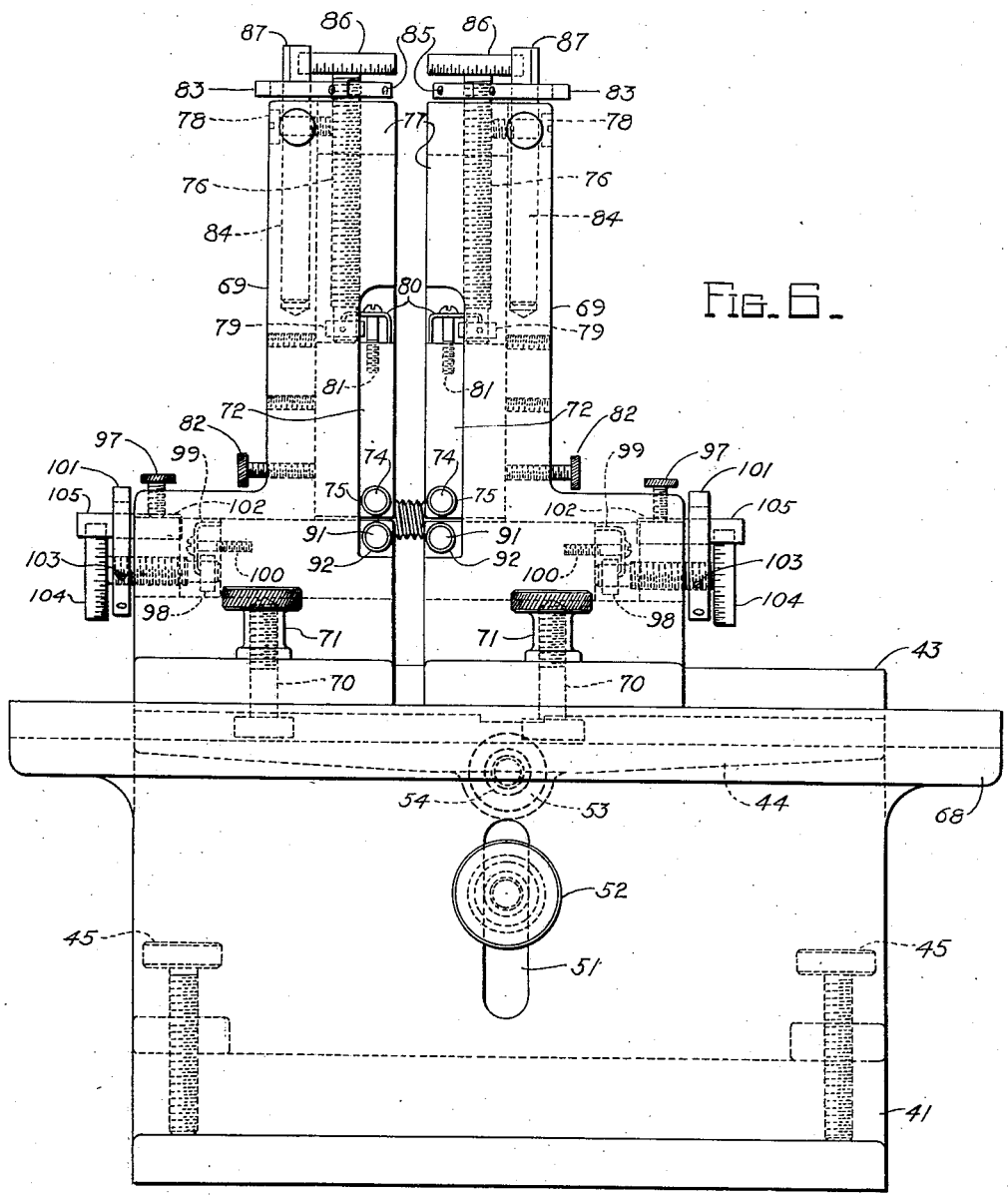

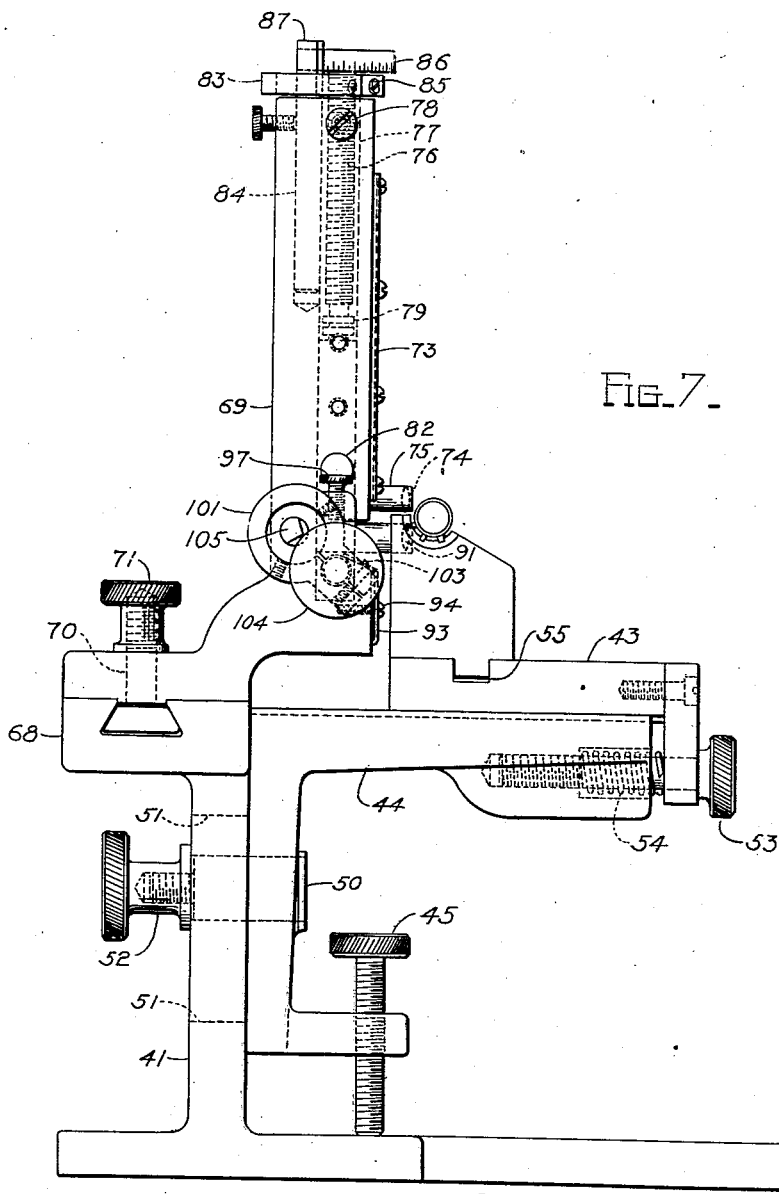

Jan. 8, 1924.
J. HARTNESS
1,480,390
APPARATUS FOR INSPECTING AND GAUGING SCREW THREADS
Filed Feb. 17, 1920    12 Sheets-Sheet 6
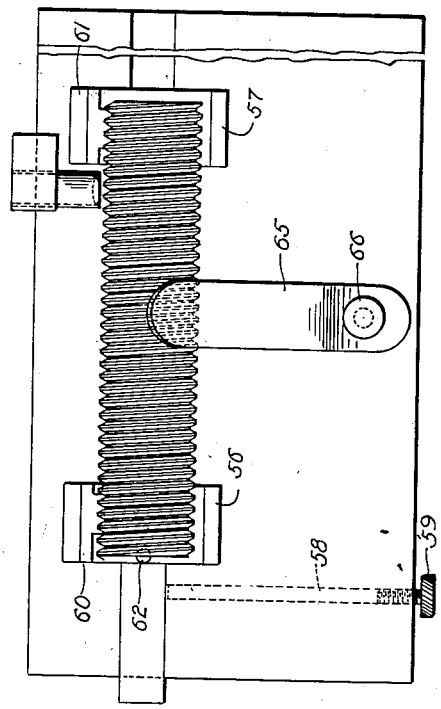
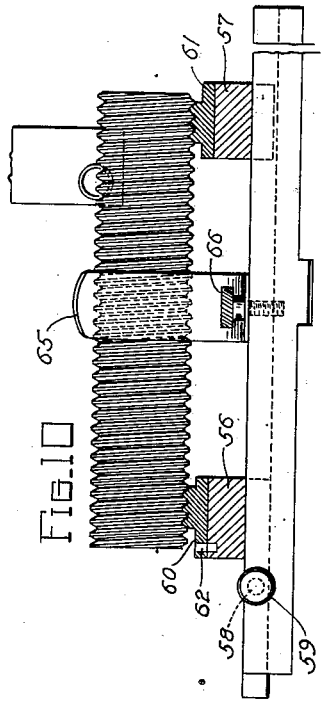
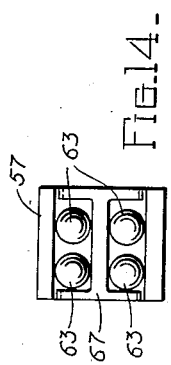
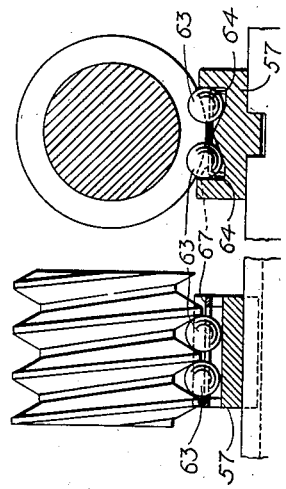
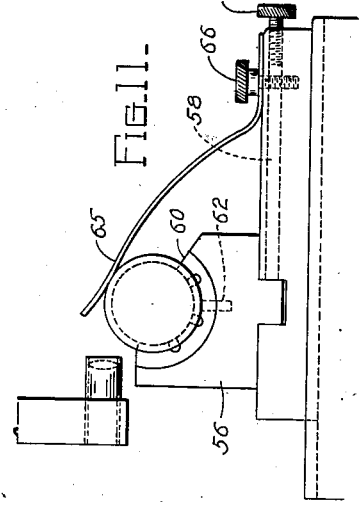
Inventor:
JAMES HARTNESS
Attys.

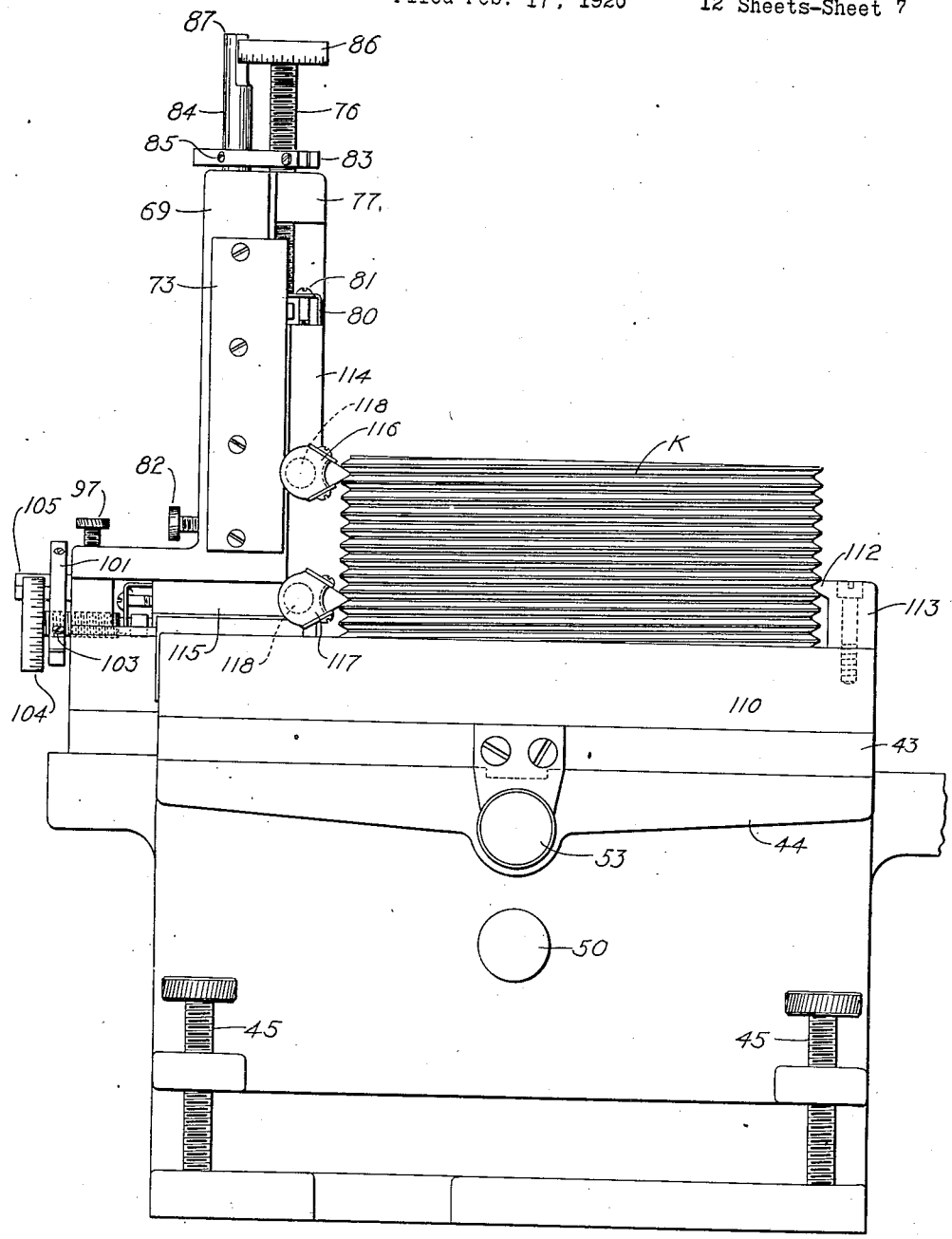

Jan. 8, 1924. 1,480,390
J. HARTNESS
APPARATUS FOR INSPECTING AND GAUGING SCREW THREADS
Filed Feb. 17, 1920 12 Sheets-Sheet 9
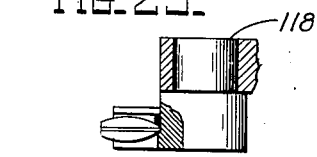
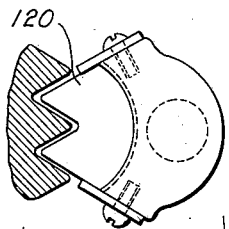
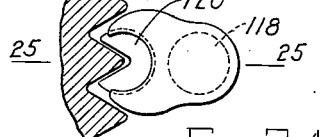
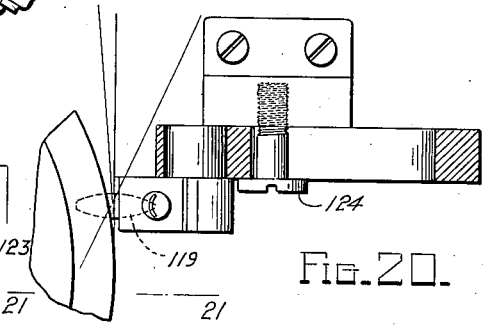
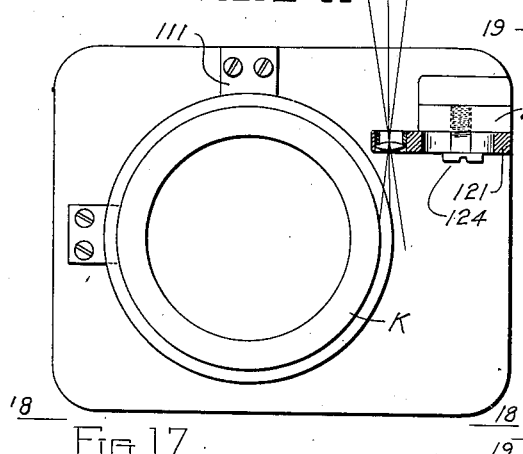
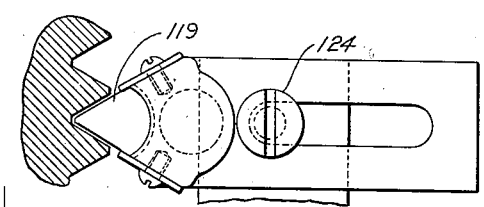
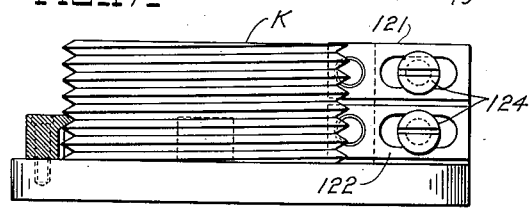
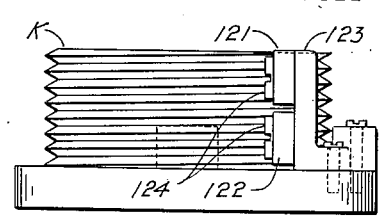
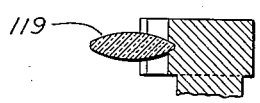
Inventor:
JAMES HARTNESS.
Attys.

Jan. 8, 1924. 1,480,390
J. HARTNESS
APPARATUS FOR INSPECTING AND GAUGING SCREW THREADS
Filed Feb. 17, 1920 12 Sheets-Sheet 10

Inventor:
JAMES HARTNESS
Attys.

Jan. 8, 1924. 1,480,390
J. HARTNESS
APPARATUS FOR INSPECTING AND GAUGING SCREW THREADS
Filed Feb. 17, 1920 12 Sheets-Sheet 11

*Inventor:*
JAMES HARTNESS

Attys.

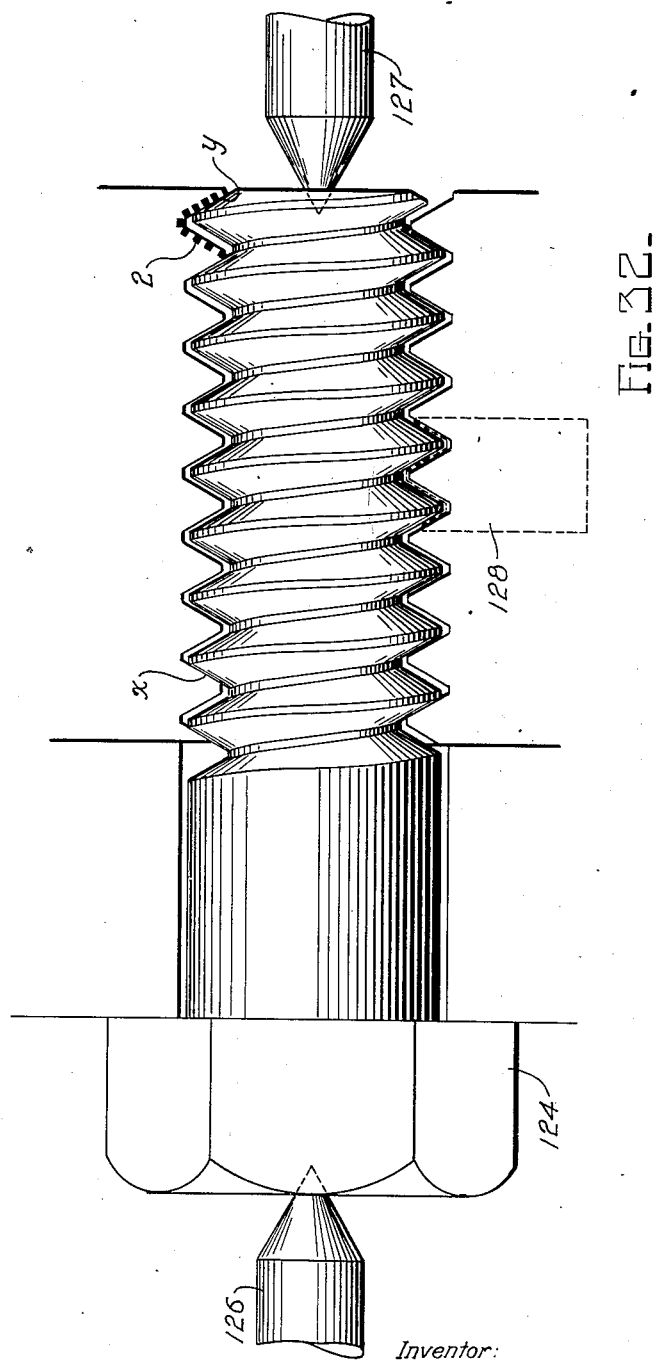

Patented Jan. 8, 1924.

1,480,390

UNITED STATES PATENT OFFICE.

JAMES HARTNESS, OF SPRINGFIELD, VERMONT.

APPARATUS FOR INSPECTING AND GAUGING SCREW THREADS.

Original application filed January 16, 1919, Serial No. 271,540. Divided and this application filed February 17, 1920. Serial No. 359,394.

*To all whom it may concern:*

Be it known that I, JAMES HARTNESS, a citizen of the United States, residing at Springfield, in the county of Windsor and State of Vermont, have invented new and useful Improvements in Apparatus for Inspecting and Gauging Screw Threads, of which the following is a specification.

This invention has for its object the provision of an apparatus for inspecting and gauging screw-threaded elements.

Briefly stated, the efficiency, or dependability and efficacy in use, of a screw may be said generally to depend upon the following elements:—(a) diameter, as expressed in terms of pitch diameter, which is the effective diameter taken at the mean depth of the thread, although a screw is known or designated by its largest or normal diameter taken over the crest of the thread; (b) lead, indicated by the number of threads per inch; (c) form or profile of the thread; (d) smoothness and density of surface; (e) roundness, as relates to the circular path of the helix; and (f) parallelism or taper of the threads. These elements are all interrelated. If it were not necessary to make the parts so that any screw of a given size may fit any tapped hole of that size, it would only be necessary to ensure that the two component parts truly fitted, but, since the parts must be made interchangeable, it is necessary to produce screw threads on both the bolt and tapped hole which are true to certain specified standards. This requires working to gages so that the size of the thread of the screw and nut will never exceed certain boundaries. Whether the boundary allows no freedom, as when the largest screw is turned into the smallest nut, or there is a certain predetermined freedom of play, it is still necessary to determine how large an internal thread may be made and still be acceptable, and how small the screw may be made and be acceptable; or, in other words, the maximum degree of tightness or closeness and looseness of fit of the screw in its component part, which can be tolerated without impairing the requisite dependability and fit of the screw and nut for service, must be ascertained and measured.

Again, since it is not practicable to produce screws of perfect uniformity, it is customary to allow a certain range of variation or tolerance, and it is necessary therefore to gage the screw to see whether it is within this range of tolerance.

One of the purposes of the present invention is to enable one manufacturing or using threaded elements to inspect the work before it is put into service, to determine whether or not it comes within specified boundaries of variation and tolerance.

The form of the U. S. standard thread is secured by a cutting tool having an included angle of 60°. This tool is truncated or flatted at the end to an extent which amounts to ⅛ of its travel per revolution. The top of the thread has a similar flat. It is, therefore, another object of the invention to inspect, gage and measure not only the diameter of the various parts of the screw, but also to gage and measure the degree of departure of the screw thread from the specified 60° of angle. In order that there may be an equal distribution of the stress of work on all of the engaged threads of the two threaded parts, it is necessary to inspect and gage the form of the thread, that is, the profile which shows the flats at the sides and at the crest and hollow of the thread, and, since the helix, because of errors in the process of manufacture, may not advance uniformly but may produce a thread which is known as a "drunken" thread, the degree of uniformity of this advance should be ascertained and inaccuracies determined.

Again it is necessary to gage the thread for roundness, for die-cut threads are frequently "out of round" due to excessive clearance of the cutting tools and unevenness of the adjustment of the cutters of the die.

The surface of a screw should be likewise inspected. A die-cut thread, especially threads of 10 pitch and coarser, may be very rough and a microscope would show its surface to be "like a plowed field," as a result of the action of the cutting tools, which, instead of cleanly removing the metal, have crowded or torn out the metal. Hence it is desirable to inspect the surface to ascertain the compactness of the sides of crests and hollows of the threads.

My invention consists of an apparatus by which an inspector can quickly compare a screw with a standard screw and detect any errors or deviations in the diameter, lead, form or profile, roundness and fit, as well as the surface of the threads, and ascertain whether such errors or deviations come within the limitations of permitted tolerance.

The apparatus includes broadly means for magnifying the profile of a selected portion of the helix of an accurately positioned screw so that the magnified image may be compared with a chart which indicates the magnified profile of a corresponding portion of a similarly positioned master or standard screw, and preferably the chart should indicate the boundaries or permissive deviation or tolerance in respect of diameter, contour and lead within which the magnified image of the selected portion of the screw being gaged should lie. It is apparent that the magnified image of the selected part of the helix of the thread undergoing inspection should be viewed in reference to the chart, and whether the image is seen through the chart or on the surface of the chart is immaterial. That portion of the helix of the thread, which is thus compared with the chart, is spaced from a fixed point which determines the position of the whole screw.

The apparatus, which may be termed a "comparator", as shown, includes a projection lantern of any suitable character, a stage or support for the threaded element to be inspected or gaged, and a projection or tolerance chart upon which the image of the screw may be projected to be compared with the image of a standard screw imprinted or otherwise indicated upon the chart. By a suitable lens of short focal length, the images are greatly enlarged, say 50 to 200 times, so that the errors or deviations in the screw undergoing inspection, including roughness or inequalities of the surface of the threads, are apparent. The stage is preferably provided with spaced cradles, in which the screw is supported, one of the cradles being fixed (but adjustable by preference), and the other being, if necessary, movable towards and from it. A chart holder is also a desirable element of the machine in case the charts are made of flexible material such as paper or pasteboard, and is usually adjustable towards and from the lens as well as in different directions parallel to the plane of the chart.

On the drawings, I have illustrated and in the following specification I shall describe both simple and more complex forms of apparatus or optical comparators, embodying the invention, which may be employed for inspecting and gauging threads; but it will be understood that various changes may be made in the apparatus as illustrated, without departing from the spirit and scope of the invention as defined in the claims.

Referring to the drawings—

Figure 1 represents in plan view a very simple screw-inspecting and gauging apparatus, in which but one magnifying lens is employed.

Figure 2 represents a side elevation of the same.

Figure 3 represents a projection or tolerance chart and its holder.

Figure 4 represents a side elevation of the chart holder.

Figure 5 represents in front elevation a more complex form of mechanism for supporting the screw to be gaged and the lenses for projecting the shadows or images of certain of the threads upon the chart.

Figure 6 represents a rear elevation of the same.

Figure 7 represents a side view of the same.

Figure 8 represents a plan view of the same.

Figure 9 shows in plan view, somewhat enlarged, the stage and cradles thereon for the screw thread, one of the lenses being likewise illustrated.

Figure 10 represents a front elevation of the same and shows the cradles in section.

Figure 11 represents an end view of the same.

Figures 12, 13 and 14 illustrate another form of cradle which may be used, in which the screw rests upon balls.

Figure 15 shows a stage for supporting a vertically arranged screw, and also illustrates a different form of lens.

Figures 17, 18 and 19 illustrate a stage having a large vertically-arranged screw thereon and lenses for magnifying the threads.

Figures 20 to 25 inclusive illustrate lenses which are mutilated or ground to fit the threads of the screw so that they may be located in close proximity thereto.

Figures 26, 27:
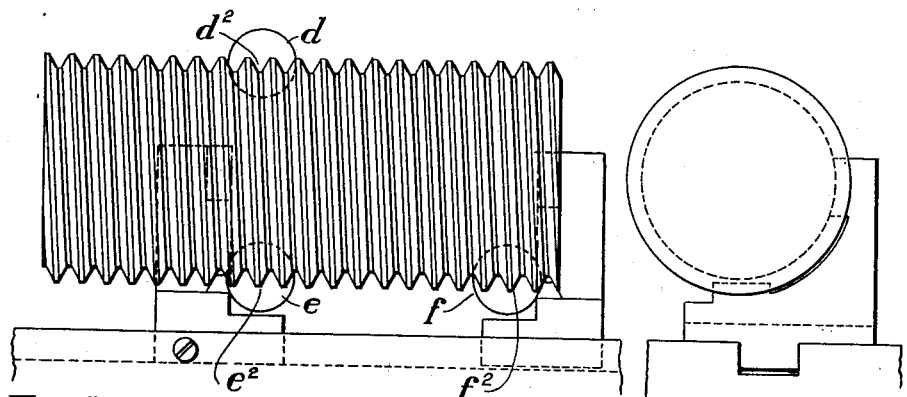

Figures 26 and 27 illustrate a screw located upon a stage with the lenses positioned to magnify the image or shadow of certain of the threads.

Figure 28:
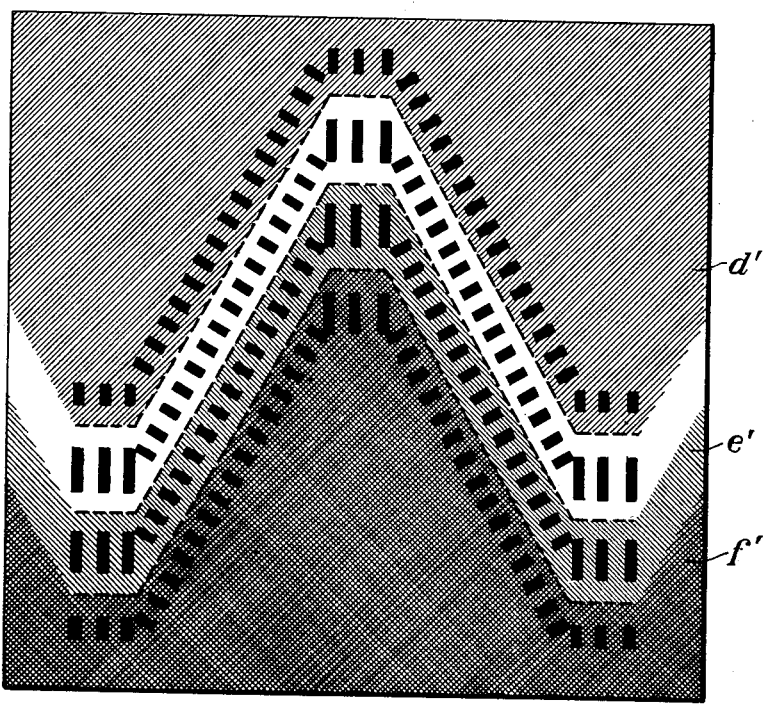

Figure 28 represents the projection or tolerance chart, and shows the images or shadows projected thereon to be compared with like threads of a perfect thread.

Figures 29, 30:
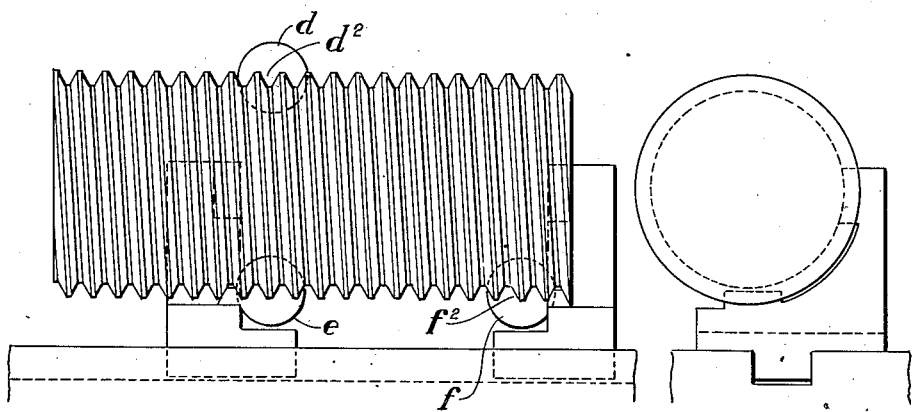

Figures 29 and 30 are views similar to Figures 26 and 27 but the screw is supposed to be imperfectly threaded.

Figure 31:
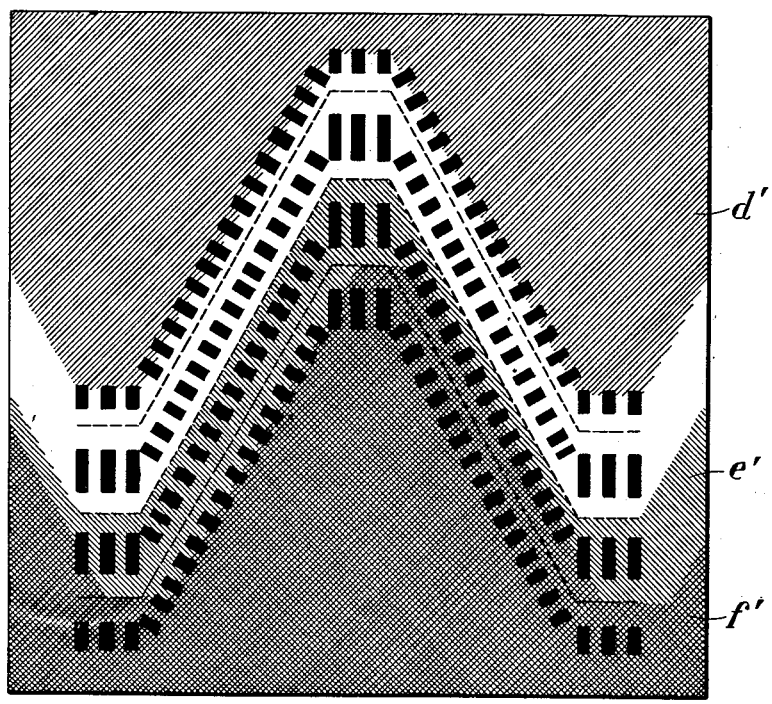

Figure 31 shows the tolerance chart upon which the images or shadows of threads of the imperfect screw have been cast or projected.

Figure 32 illustrates a cap bolt in which the diameter of the screw is reduced and the error in lead is so great as to make it barely possible for the screw to enter the threaded hole.

Referring first to Figures 1 to 4 inclusive,

I have shown a simple apparatus which may be used in gauging screws, an explanation of which will make clear the principles involved in the more complex forms of apparatus herein described. Upon one end of a table 30 is placed a projection lantern indicated as a whole at 31. For various reasons, unnecessary here to enumerate, I find the light produced by an electric arc to be satisfactory, and I have therefore indicated the lantern as provided with the usual arc-light electrodes 32 which are included in an electric circuit not shown. The light rays are gathered by a lens or condenser 33 so as to be projected in parallelism. At the other end of the table, there is an upright carriage 34, the base of which is arranged to slide toward or from the lantern on parallel guides or ways 35. A chart holder 36, having a plane front surface, is supported upon the carriage and may be adjusted up and down and sidewise by screws 37, 37, and 38, the latter exerting its stress against the pressure of a takeup spring 39. Upon the face of the holder is tacked or otherwise secured a screen or chart 40 imprinted with a picture representing a standard thread in profile, and preferably showing the boundaries of the tolerance or the maximum permissive deviations therefrom.

Between the lantern and the chart, there are arranged, in the order named, a stage 43 for the threaded element to be gaged and a lens for projecting the shadow or image of one or more of the threads. For purposes of accuracy, stability and simplicity, I employ a support 41 which is common to the stage and to the lens, but naturally it is advisable that each of these latter elements should be capable, independently of the other, of all necessary adjustments. The support 41 may, if desired, be rigidly affixed upon the table and its base 42 is so shown. The stage 43 is located upon a bracket 44 which is vertically adjustable by screws 45, and the stage is itself capable of horizontal adjustment on the bracket towards and from the lens. On the stage are two cradles 46, 47, the former of which, though preferably capable of adjustment, is fixed when in use, and the latter of which, if designed for engagement with the helix, is freely movable toward or from the other or lengthwise of the axis of the screw to be gaged. These cradles are arranged to engage the threads or helix of and to support a screw, in and transversely of the bundle of light rays projected by the lantern so that its shadow is cast upon the projection chart. Instead, however, of causing the image or shadow of the entire screw to be cast upon the chart, I employ a lens 48 of short focal length and throw upon the screen a greatly enlarged shadow or image of the profile of only one thread or parts of two threads. The thread or portion of the helix selected to be thus projected is one located a certain distance from the fixed cradle and therefore of another thread or part of the helix, and, when it is compared with a similar image or shadow of the corresponding thread of a similarly held or positioned standard or perfect screw, it will be apparent that the infect screw, it will be able to detect and measure spector will be able to detect and measure not only errors in diameter and in the form or profile of the thread, but also cumulative errors in the lead of the screw. The lens 48 is mounted in a holder 49 secured on the support 41 in such wise that it is capable of up and down and sidewise adjustment. On the chart 40 there is indicated by broken line $a$ the minimum size at which the operator producing the screw threads should aim, so that the variation in size of the thread due to the uncertainties of machine operation may fall each side of the said neutral line. The zone between the heavy broken lines $b$ and $b'$ mark the boundaries of tolerance. In practice, I use a master screw that constitutes the maximum diameter. In adjusting the instrument, I place a master screw in the cradle, and relatively adjust the fixed cradle, the lens and the projection chart, so as to throw the image of one thread of the master screw along the top edge of heavy broken line $b'$. This constitutes the largest boundary. It will be understood that the lens reverses the shadow so that the largest boundary will be indicated by the low position of the shadow on the chart, and the smallest boundary by the high portion. The inside of broken line $b$ becomes the location of the shadow of the smallest size acceptable screw, the dimensions of this zone between these two lines depending, of course, on the character of the work. After the instrument has been adjusted for the master screw, the screws to be gaged are placed one after another in the cradle and assorted according to the position of the shadow cast. Any variation between the projected thread and the thread which has been imprinted or indicated upon the chart is at once apparent and the deviations or errors can be at once detected and measured. As lenses of different focal lengths may be employed for screws of different sizes, I have shown upon the upper surface of the table a scale 49$^a$ for indicating the position of the chart holder for lenses of different focal lengths to secure images of the desired magnitude. For instance, the scale has provision for lenses of 5 inch, 1 inch, 1$\frac{5}{10}$ inch, and 2 inch focal lengths, and the number of times which the object will be enlarged on the chart are indicated on the various divisions of the scale so as to assist the operator in locating the position of the chart holder with facility.

Referring now to Figures 5 to 8 inclusive, I have shown an apparatus in which there are four lenses for projecting the images or shadows of the threads, so that the images will be superimposed upon the chart, as shown in Figure 28. The holder 41 carries the bracket 44 which may be vertically adjusted by the screws 45, 45. The bracket has the bolt 50 which passes through a slot 51 in the holder 41 and which is equipped with a milled nut 52 so as to clamp the bracket in place after it has been adjusted. The stage 43 is adjusted towards and from the lens by an adjustment screw 53 which operates against the pressure of a spring 54 seated in a recess in the horizontal portion of the bracket. The stage 43 has the transverse groove or guideway 55 in which the cradle or cradles for the screw are mounted to slide. The two cradles are indicated at 56, 57, see Figures 9 to 11 inclusive, the former being usually clamped against movement by a clamping pin 58 operated by the screw 59. The cradle 57 is freely movable towards and from that at 56. The cradles, as shown in Figures 9 and 10, are provided with segmental threaded members 60, 61, which will fit the threads of the screw to be gaged and the member 60 is held against movement by a dowel pin 62. These cradles are adjustable towards and from each other to accommodate screws of different lengths. Instead of having threaded elements or members for engaging the screw to be inspected, I may employ for the cradle 57 members such as indicated in Figures 12 to 14 inclusive. In this case, the cradle is provided with a plurality of balls 63, 63, arranged in grooves 64, and capable of movement longitudinally of the axis of the screw so that they may adjust themselves to the threads of the screw being inspected. A suitable spacer 67 is employed for preventing dislocation of the balls. I may use a leaf-spring 65, one end of which is rotatively secured to the stage by a screw 66 and the free end of which may engage the screw being inspected midway between its ends so as to ensure that it seats itself accurately in the cradles. After the screw has once been located in the cradle, it may be rotated by hand for a purpose to be described.

The lenses for magnifying the threads, located at different portions of the screw undergoing inspection, are all capable of independent adjustment. Two of them are located in a position to magnify the threads of what I may call the bottom or under side of the screw and the other two are located to magnify threads at the top or upper side of the screw. The holder 41 is provided with a horizontal grooved guideway 68, in which are mounted the bases of two standards 69 which are adjustable towards and from each other and which may be clamped to the holder by any suitable mechanism such as the headed screw 70 and nut 71. Each standard 69 is provided with a vertical slide 72 held in place by a strong spring-friction plate 73 secured to the standard, and having a flange bent at an angle and engaging the beveled side wall of a groove formed in the slide. Each slide is provided with a lens 74 mounted in a tubular holder 75 so that the lens may be brought close to the screw. Each slide is capable of vertical adjustment by means of a screw 76 passing through a nut 77 affixed in the upper end of the standard by a screw 78. On the lower unthreaded end of the screw 76 there is pinned a collar 79 against which rests the end of a bent plate 80, and the other end of which bears against the upper end of the slide 72. A screw 81 passes through the plate into the slide and ensures that the screw 76 is rotatively clamped to the slide, so that, when it is adjusted, the slide will move with it. An adjustment of the slide 72 lengthwise of the screw to be measured can be effected by a screw 82 passed through the side of the standard, as shown in Figure 6. (Any suitable device may be utilized to hold the main adjusting screw 76 against movement after it has been adjusted to the desired position. For this purpose, I may use a split clamp 83 fastened to the upper end of an upright rod 84 inserted in the standard. The clamp embraces the main adjusting screw 76, and, after the latter has been adjusted, the split portions may be drawn tightly together by any suitable clamping screws. This clamp 83 is secured to the end of the guide rod 84 by screws 85.) For convenience in adjustment, the head of the main screw 76 may be provided with a micrometer scale 86 for cooperation with a stud 87 on the end of the guide rod.

Arranged to slide horizontally in the two standards there are two horizontally arranged slides 90, 90, each of which is provided with a lens 91 in a suitable tubular holder 92. As these two slides and their operating mechanisms are the same, I shall describe but one of them. Each said slide is held in place by a spring friction plate 93 fastened to the front of the base of each standard by screws 94. The plate 93 has an inturned flange on its lower edge which bears against the said base, and at its upper edge it has an inturned flange bearing against the beveled wall of a groove in the slide 90. Each slide is adjusted by a horizontally-arranged adjustment screw 95, passed through a nut 96 located at the side of the base of the standard and held in place by a set screw 97. The inner end of the adjusting screw 95 has a collar 98 pinned upon it, and the end of the screw is kept in contact with the slide by a bent spring plate 99 through which a screw 100 is passed into the end of the slide. (A split clamp 101, similar to that at 83, is hung upon a guide rod 102; and, after the adjustment screw has been rotated to the desired point, the clamp may be drawn together by a clamping screw 103 to clamp the adjustment screw or lead screw against further movement.) The head of the adjustment screw has a micrometer scale 104 for cooperation with a stationary stud 105 on the end of the rod 102.

From the foregoing description, it will be observed that the two standards which support the lenses are capable of independent adjustment towards and from each other, each carrying with it two of the lenses. The lower lens on each standard may be adjusted horizontally, whereas the other is capable of vertical adjustment. Since the stage itself is vertically adjustable, it will be seen that the apparatus has quite a wide range, so that it may be used for the inspection of both large and small screws. As illustrated in Figures 5 to 8 inclusive, two of the lenses are arranged to magnify the shadow or image of two relatively remote threads at the top of the screw and the two lower lenses 91 are arranged to magnify relatively and laterally remote threads at the bottom of the screw. These lenses are set so that the images or shadows magnified thereby will fall upon the tolerance chart as shown in Figures 28 and 31. In this case, I have omitted one of the lenses and have used but three, as indicated in Figure 26, at $d$ $e$ and $f$ respectively. The images magnified by the lenses are indicated respectively at $d'$ $e'$ and $f'$. The heavy block broken lines indicate the permitted tolerance or variation for each thread, and the thinner broken line between the tolerance lines represents the standard perfect thread. In Figures 26 and 27, the screw is assumed to be practically perfect, the valley $d^2$ matches exactly the thread $d'$ as magnified by the lens $d$, and the thread $f^2$ as magnified by the lens $f$ matches exactly the thread $f'$, thus showing (1) that the profiles of the threads are perfect as to angularity and as to the flats at the crests and bases of the threads; (2) that the lead is perfect; (3) that the diameter is perfect; and (4) that the surfaces of the sides, crests and bases of the threads are smooth and not rough. By rotating the screw, it can be seen whether or not the magnified images or shadows remain constant, thus indicating whether the roundness of the thread is perfect. On Figure 31, I have shown a chart upon which the magnified images or shadows of an imperfect screw have been cast. The shadow $d'$ of the thread or valley $d^2$ does not fall within the tolerance lines, thus indicating that the diameter of the screw is too small. The shadow $f'$ of the thread $f^2$, as magnified by the lens $f$, is to one side of the indicated line for the thread and shows that the lead of the screw is too short.

From these illustrations, it will be apparent that an inspector is able quickly to inspect a screw for diameter, form, roundness, etc., and quickly measure any deviations or inaccuracies. Ordinarily it is not necessary to use as many as four lenses, or even three. For many screws a single lens, located at a certain point remote from the fixed cradle, is sufficient to detect inaccuracies in lead, diameter, profile, etc. In some cases, I employ only two lenses at $d$ and $f$. Instead of locating the upper lenses directly above the lower lenses, they may be all located at intervals along the screw.

In Figure 32, I have illustrated a cap bolt 124 in which the diameter of the screw is reduced and the lead error is so great as to make it barely possible for the screw to enter the threaded hole. It will be seen that the lead error makes the screw fit at the ends of the threaded hole at $x$ and $y$ only. In the middle of the length of its engagement with the nut, the screw normally stands clear of the thread of the latter. It is obvious that, if one can get by duplicating before the lantern the conditions that exist in a thread engagement at the ends of the screw, one is able to detect at a glance those errors which have heretofore required a very indirect method to ascertain.

Although I prefer not to support the screw on the center points, I have indicated center points for purpose of making clear the principles involved. Let it be assumed that the screw being gaged in one that has been turned in a lathe on center points, and further that the stage is provided with a pair of center points 126, 127, on which the screw may be held in true position vertically and laterally, but adapted to be engaged by a gage or fixed cradle 128 which is free to move vertically, but which is held against movement that would be longitudinally of the axis of the screw. Now, if this apparatus has been set up to hold a standard screw having a perfect thread and the shadow of the thread is reflected on the chart so that it closely fits the under side of dotted line $z$ (which in this case constitutes the dimensions of the largest boundary of tolerance), it will be found that a screw, in which the lead is in error, when placed in the same mounting will shift longitudinally of its axis an amount that will indicate exactly the situation at the ends of the length of engagement, providing the distance between the fixed cradle and the projected thread is one-half the length of the engagement of the thread. If the lead is untrue and the diameter is large, it is clear that the shadow will overlap the dotted line and indicate that the screw, although it may partly enter the threaded hole, cannot be turned all the way through without the use of force which would result in deforming the thread surface.

This is the principle involved in the use of the cradles; but, since the cradle takes its bearing on the outside or periphery of the thread, rather than in the center of the screw, a difference in diameter of .001 inch shows a shadow displacement indicating the full .001 inch; whereas, if the screw were held on center points, that difference of .001 inch would be equally distributed on two sides of the center, and the displacement on the chart would indicate only one-half of .001 inch.

Since lead and diameter jointly effect the fit of the screw in the threaded hole, and since an indication of the thread at the end of the length of engagement is desired, the fixed cradle must be located farther away or remote from the projected thread. In fact, I locate the fixed cradle from the projected thread a distance about equal to the length of effective engagement of the screw instead of half of that length, so that both the lead error and the diameter error will play an equal part in the displacement of the shadow on the chart; and in practice it may be desirable to select other distances, even when the length of engagement is known, taking into consideration other elements, yet this selection of a definite relation of the fixed cradle and lens longitudinally of the screw axis is of great value.

Since this location of the fixed cradle in reference to the lens doubles the displacement of the shadow, due to errors in lead and diameter, it is easy to detect the errors on the chart, since the distance between the heavy broken lines which mark the zone of tolerance is doubled, although this makes the reduction in thread engagement due to change of diameter appear to be twice as great as normal, and to that extent makes it necessary for the observer to keep in mind that the chart does not indicate the exact percentage of engagement of thread.

For instance, the chart, in which the boundary for the smaller thread stands away from the boundary of the larger thread an amount that indicates an engagement of only 80%, does not represent the depth of engagement of that thread in the threaded hole made to fit a standard screw, but it does indicate the extreme variation that would exist between the smallest screw and the largest hole, providing the tolerance in variation in the threaded hole equaled the tolerance of the screw. In each case, the variation would be 10% of the depth of the thread. The chart, as used in measuring the screw, would indicate the worst condition that would exist between the smallest screw and the largest hole, which after all is of greater importance than reflecting the true condition of depth of thread engagement between the screw being gaged and a thread hole of exactly standard or basis size, for this constitutes the minimum size in the range of tolerance for producing the threaded hole.

Figure 16:
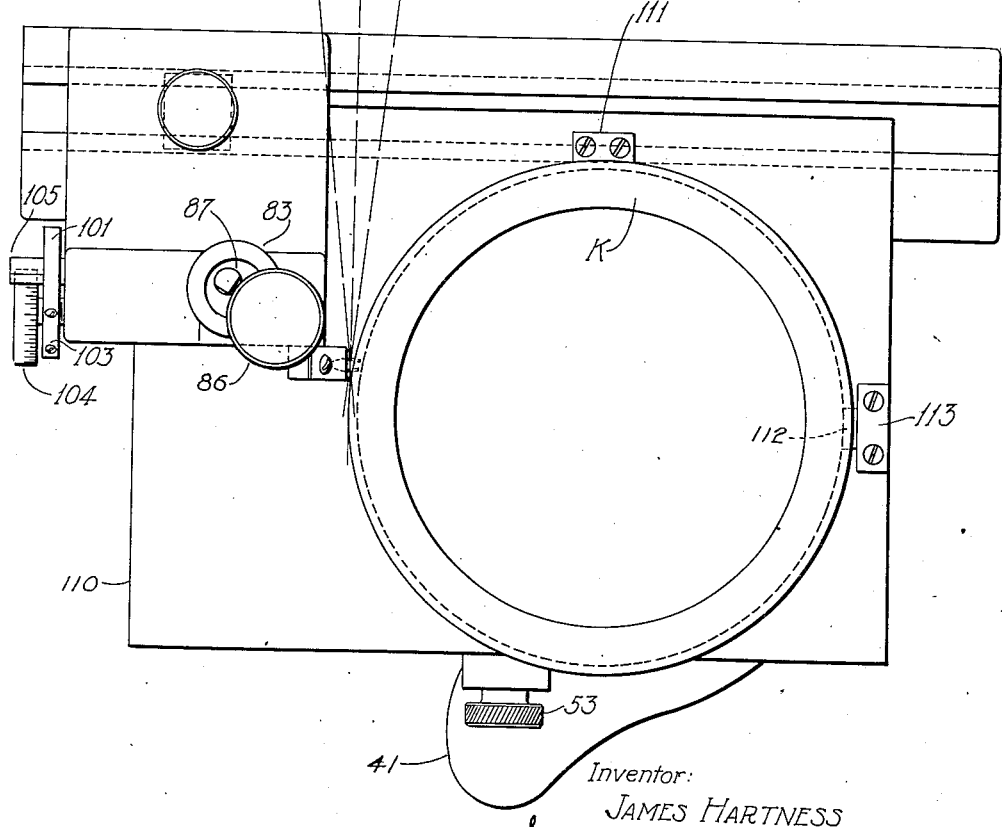
Figure 16 represents a plan view of the same.

In some cases, where it is desired to inspect large threads of relatively short axial diameter, I may employ the apparatus shown in Figures 15 to 20 inclusive. In this case, the threaded member $k$ is placed upon its end on the stage 110, and it is located thereon by pressing it against a stop 111 and rotating it until the tapered member 112 on the stop 113 fits accurately between the threads of the member $k$. The member $k$ is thus held at two points which may be said to perform the function of the cradles in the other form of apparatus previously described. In Figures 15 and 16, the slides 114, 115 for the lenses are mounted upon a single standard and they are adjusted respectively by adjustment mechanisms similar to those previously explained. The lens holder 116, 117 are each provided with a trunnion 118 having a friction fit in the associated carrier, as shown in Figure 25, so that the lens is capable of adjustment angularly about an axis. Where it is desired to magnify the thread of a large screw and to use a lens of short focal length, it is necessary, of course, to bring the lens as close to the screw as possible. Where a complete lens, as shown in Figure 17, is employed, the lens is necessarily located at some distance from the axial plane of the work which is parallel to the plane of the lens, this, of course, because of the curvature of the screw. It is possible to reduce this distance by grinding away the lens as in Figures 15, 20, 21 and 22. The lens may be ground to form a sector of 60° angle which will fit between the threads of the screws. In this case, the sector-shaped lens is indicated at 119. If desired, however, it may be ground with one or more reentrant angles as shown at 120 in Figures 23 and 24. In each of these cases, a holder to fit the lens is utilized. Instead of mounting the two lenses as in Figure 15, I have shown in Figures 18 and 19 how the carriers 121, 122 may be secured to a single upright 123 located upon the stage. In this case, each of the carriers is provided with an elongated slot through which a set screw 124 is passed into the upright 123. This simple form of mounting makes it possible to adjust each lens up and down and in and out to a limited extent so as to magnify the projected profile of the desired thread.

It will be understood that I have not attempted to illustrate all of the forms of apparatus which may be used in the practice of my invention, and further that various other forms of apparatus or optical comparators may be employed without departing from the spirit and scope of the invention as defined in the claims. By the use of the projecting apparatus and tolerance chart, any errors in lead, diameter, contour, etc., are at once apparent to the inspector. By the use of my apparatus, it is possible to establish charts for use in manufacturing or ordering screws, which can be used as specifications for defining the exact tolerance or variations from standard which may be permitted in the work produced. That is, in addition to providing a measure for the lead and the diameter, the tolerance chart and projection apparatus provide a way for indicating the extent of variation in the form of the thread which will be tolerated.

While the apparatus as herein described, does not provide for measuring an internal thread, yet it does provide a way for inspecting and measuring the tap for forming the threaded hole.

I do not herein claim the herein described method of gauging screws, since the same forms the subject matter of my application, Ser. No. 271,540, filed Jan. 16, 1919, of which the instant case is a division.

Having thus explained the nature of my said invention and described a way of making and using the same, although without attempting to set forth all of the forms in which it may be made or all of the modes of its use, what I claim is:

1. Screw-gauging apparatus comprising a stage for supporting a screw and having a fixed point for definitely locating one portion of the helix of the screw, means for producing the magnified image of a portion of the helix of said screw spaced from said fixed point, and a chart on which the magnified image may be viewed and having a portion of a standard thread indicated thereon.

2. Screw-gauging apparatus comprising a stage for supporting a screw and having a fixed point for definitely locating one portion of the helix of a screw, means spaced from said fixed point for producing a magnified image of another portion of said helix, and a chart on which said magnified image may be viewed, and having indicated thereon the boundaries of tolerance, similarly magnified, of a portion of the helix of a standard screw.

3. Screw-gauging apparatus comprising a stage for supporting a screw and having a fixed member for definitely locating one portion of the screw helix, a tolerance chart, a lens spaced from said fixed point, and a source of light arranged in reference to said lens and chart to project upon the chart another portion of the screw helix.

4. Screw-gauging apparatus comprising a stage for the screw, a tolerance chart, a lantern, and means for projecting an enlarged image of one or more of the threads upon the chart.

5. Screw-gauging apparatus comprising a stage having spaced cradles for the screw, of which one is fixed, a chart having indicated thereon the magnified thread of a standard screw, a lantern, and means spaced lengthwise of the screw from the fixed cradle for projecting the magnified image of one or more of the threads upon the chart.

6. Screw-gauging apparatus comprising a lantern, a stage for peripherally supporting a screw, a tolerance chart arranged to receive the projected magnified image of one or more of the threads of said screw, and means for projecting such magnified image on said chart.

7. Screw-gauging apparatus comprising a table, an upright chart holder thereon, a lantern thereon, a short focal length lens between the chart holder and the lantern, a stage arranged to support the screw between the lens and the lantern, and a fixed member on said stage for locating a thread of said screw at a point spaced lengthwise thereof from said lens.

8. An optical comparator for measuring diameter, form of profile and advance of helix of a screw thread, comprising a source of light, a lens, a screen and a means for holding a screw consisting of two cradles, one of which engages the helix and the other to serve as a lateral support, the first cradle being remote from that part of the helix which is to be projected by the lens.

9. A screw-gauging apparatus comprising a stage provided with thread-engaging cradles for positioning a screw, a screen, means for producing and for projecting the image of one or more threads of such screw on said screen, and means for effecting relative adjustments of said stage and said lens, whereby a predetermined part of said screw may be fixed lengthwise from said image producing means.

10. A screw-gauging apparatus comprising a chart holder, a stage having thread-positioning cradles which are respectively fixed and movable, a short focal length lens remote from the fixed cradle for projecting the image or profile of one or more of the threads of the screw, mechanism for effecting relative adjustment of the stage and lens, and a lantern.

11. A screw-gauging apparatus comprising a tolerance chart, a lens, a source of light, and means for supporting a screw, including a fixed point for definitely locating a thread of said screw at a point remote from the lens, said means being adapted to hold another thread of said screw in the focus of said lens.

12. An optical comparator comprising a chart or screen to receive a magnified image, a lantern having a source of light and a condensing lens, a lens for forming the magnified image, a stage located between said condensing lens and said second-mentioned lens, and threaded or serrated cradles for engaging the sides of and supporting a threaded object to be gaged.

13. An optical screw-gauging apparatus comprising a screen to receive a magnified image, a lens for forming the magnified image, a source of light, a support having serrated or threaded faces to receive a screw to be magnified and located between the source of light and the lens, and means for adjusting said support longitudinally of the screw to bring a desired portion of the screw into the focus of the lens.

14. An apparatus for gauging screws comprising a chart or screen having a magnified image of a portion of the helix of a standard thread indicated thereon, means to produce and project upon said chart or screen the magnified image of a portion only of the helix of a screw, and means for fixing or definitely locating another portion of the screw at a point spaced from said lens lengthwise of said screw, and holding the first-mentioned portion of the helix in the focus of said lens.

15. An apparatus for gauging screws comprising a chart having marked thereon the permitted deviations from a magnified portion of a screw helix, a holder having a device for fixing or definitely locating one portion of a screw helix and means supporting another portion of the helix, and means spaced lengthwise of the screw from said first-mentioned device for projecting on said screen a magnified portion of the helix of the screw separated or spaced from the device.

16. An optical comparator for gauging screws comprising a chart having marked thereon the permitted deviations from the magnified helix of a standard screw, means for holding a screw and fixing a portion thereof in a definite location endwise thereof, and means for projecting on said chart for comparison therewith a magnified portion of the screw helix spaced from said fixed portion of said helix.

In testimony whereof I have affixed my signature.

JAMES HARTNESS.